United States Patent
Tajima et al.

(10) Patent No.: US 7,112,235 B2
(45) Date of Patent: Sep. 26, 2006

(54) CUBIC BORON NITRIDE BASE ULTRA-HIGH PRESSURE SINTERED MATERIAL CUTTING TIP

(75) Inventors: Itsurou Tajima, Ibaraki-ken (JP); Naokata Seki, Ibaraki-ken (JP); Kazuo Yamamoto, Ibaraki-ken (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 10/510,239

(22) PCT Filed: Feb. 28, 2003

(86) PCT No.: PCT/JP03/02362

§ 371 (c)(1), (2), (4) Date: Oct. 14, 2004

(87) PCT Pub. No.: WO03/089172

PCT Pub. Date: Oct. 30, 2003

(65) Prior Publication Data

US 2005/0145066 A1    Jul. 7, 2005

(30) Foreign Application Priority Data

Apr. 19, 2002   (JP)   ............... 2002-117578
Apr. 19, 2002   (JP)   ............... 2002-117580

(51) Int. Cl.
*C22C 29/16*   (2006.01)
*C04B 35/583*   (2006.01)

(52) U.S. Cl. .................. 75/238; 51/307; 501/96.4

(58) Field of Classification Search ............... 75/238; 51/307; 501/96.4
See application file for complete search history.

(56) References Cited

FOREIGN PATENT DOCUMENTS

| JP | 56-9279 | 1/1981 |
|---|---|---|
| JP | 56-156738 | 12/1981 |
| JP | 58-113348 | 7/1983 |
| JP | 58-164750 | 9/1983 |
| JP | 59-41445 | 3/1984 |
| JP | 61-201751 | 9/1988 |
| JP | 2001-322006 | 11/2001 |

*Primary Examiner*—Ngoclan T. Mai
(74) *Attorney, Agent, or Firm*—Oblon, Spivak, McClelland, Maier & Neustadt, P.C.

(57) ABSTRACT

A cutting insert exhibiting excellent chipping resistance made of cubic boron nitride based ultra-high pressure sintered material. The cutting insert made of cubic boron nitride based ultra-high pressure sintered material exhibits, in a structural observation using an electron microscope, a substantial three-phase structure including a continuously bonded phase, a hard dispersed phase, and an intermediate adhesion phase intervening between the continuously bonded phase and the hard dispersed phase, and includes a cubic boron nitride based ultra-high pressure sintered material including: 15 to 56 wt % of at least two components selected from titanium nitride, titanium carbonitride, and titanium carbide, or 15 to 56 wt % titanium carbonitride, for forming the continuously bonded phase; 2 to 10 wt % nitride compound having titanium and aluminum and 2 to 10 wt % tungsten carbide, for forming the intermediate adhesion phase; and (35 to 65 wt %) cubic boron nitride, as the balance, for forming the hard dispersed phase.

6 Claims, No Drawings

CUBIC BORON NITRIDE BASE ULTRA-HIGH PRESSURE SINTERED MATERIAL CUTTING TIP

FIELD OF THE INVENTION

The present invention relates to a cutting insert including cubic boron nitride based ultra-high pressure sintered material (hereinafter referred to as c-BN based sintered cutting insert) which exhibits excellent chipping resistance even when it is used for performing finish cutting of a difficult-to-machine material, such as high-hardened steel, at high speed.

BACKGROUND ART

Conventionally, in general, as one of c-BN based sintered cutting inserts, a type of c-BN based sintered cutting insert is known which includes a sintered compact made of cubic boron nitride based ultra-high pressure sintered material (hereinafter referred to as c-BN based material), the sintered compact substantially exhibiting a two-phase structure having a continuously bonded phase and a hard dispersed phase when observed using a scanning electron microscope, and including 20 to 45 wt % at least one component as the continuously bonded phase selected from titanium nitride (hereinafter referred to as TiN), titanium carbonitride (hereinafter referred to as TiCN), and titanium carbide (hereinafter referred to as TiC), and, as the balance, cubic boron nitride (hereinafter referred to as c-BN) as the hard dispersed phase, as disclosed, for example, in Japanese Unexamined Patent Application, First Publication No. Sho 53-77811, and moreover, it is also known that such c-BN based sintered cutting inserts are used, for example, for performing surface finish cutting of various steels and cast irons.

On the other hand, in recent years, cutting apparatuses tend to have significantly high performance and high power, and in addition, it is strongly demanded that cutting operations be performed with less power and less energy; therefore, cutting operations tend to be performed at high speed. However, when the above-mentioned conventional c-BN based sintered cutting inserts or other type of c-BN based sintered cutting inserts are used for performing finish cutting of a difficult-to-machine material, such as high-hardened steel, at high speed, a c-BN phase, which is a hard dispersed phase substantially corresponding to TiCN forming a continuously bonded phase, tends to be separated due to insufficient adhesion of the c-BN phase. As a result, the cutting edge tends to chip (i.e., to have micro-breakage), which leads to a relatively short operation life.

DISCLOSURE OF THE INVENTION

In view of the above circumstances, the inventors have conducted research to develop c-BN based sintered cutting inserts having excellent chipping resistance, and found the facts that when a powder of nitride compound having Ti and Al (hereinafter referred to as (Ti, Al) N)) and a powder of tungsten carbide (hereinafter referred to as WC) are used as ingredient powders in addition to powders of c-BN, TiN, TiCN, and TiCN as ingredient powders, and then a green compact, which includes 15 to 56 wt % (hereinafter "%" indicates wt %) of at least two components selected from TiN, TiCN, and TiC, or 15 to 56% TiCN, 2 to 10% (Ti, Al) N, 2 to 10% WC, and, as the balance, (but 35 to 65%) c-BN, is sintered under ultra-high pressure to form a c-BN based sintered cutting insert, the c-BN based sintered cutting insert formed using the c-BN based material having the above ingredients exhibits excellent long-term cutting performance without having chipping at the cutting edge thereof due to insufficient adhesion of the c-BN phase even when it is used for performing finish cutting of a difficult-to-machine material, such as high-hardened steel, at high speed, because the powders of (Ti, Al) N and WC, among all of the components, preferentially aggregate on the surface of the powder of c-BN and react therewith so as to form a reaction product during the sintering process, in the c-BN based material having been sintered, the reaction product intervenes between a continuously bonded phase substantially made of TiCN and a hard dispersed phase substantially made of c-BN phase, and moreover, the reaction product is firmly connected with both TiCN forming the continuously bonded phase and c-BN forming the hard dispersed phase so as to act as an intermediate adhesion phase.

The present invention was conceived based on the above research results, and the present invention provides a c-BN based sintered cutting insert having excellent chipping resistance formed by compacting and sintering cubic boron nitride based material exhibiting, in a structural observation using an electron microscope, a substantial three-phase structure including a continuously bonded phase, a hard dispersed phase, and an intermediate adhesion phase intervening between the continuously bonded phase and the hard dispersed phase, the c-BN based material consisting of: 15 to 56% (hereinafter "%" indicates wt %) of at least two components selected from TiN, TiCN, and TiC, or 15 to 56% TiCN, for forming the continuously bonded phase; 2 to 10% (Ti, Al) N and 2 to 10 wt % WC, for forming the intermediate adhesion phase; and (35 to 65%) c-BN, as the balance, for forming the hard dispersed phase.

Next, in the c-BN based sintered cutting insert according to the present invention, the reason the composition of the c-BN based material for forming the same was limited as described above will be explained below.

(a) TiN, TiCN, and TiC

These components improve sintering performance, and also increase strength by forming a continuously bonded phase substantially consisting of a TiCN phase; however, if the blending ratio thereof is less than 15%, desired strength cannot be ensured, and on the other hand, if the blending ratio thereof is greater than 56%, wear resistance is significantly decreased; therefore, the blending ratio was set from 15 to 56%. It is more preferable that the blending ratio be set from 30 to 50%.

(b) (Ti, Al) N and WC

As described above, these components preferentially aggregate on the surface of the powder of c-BN and react therewith so as to form a reaction product during the sintering process, and, in the c-BN based material having been sintered, the reaction product intervenes between the TiCN phase as the continuously bonded phase and the c-BN phase as the hard dispersed phase. Moreover, because the reaction product tends to be firmly connected with both the TiCN phase as the continuously bonded phase and the c-BN phase as the hard dispersed phase, adhesion of the c-BN phase to the TiCN phase as the continuously bonded phase is significantly improved, so that chipping resistance of the cutting edge is improved. However, when the blending ratio of at least one of these components deviates from the above-defined range, the component, as the intermediate adhesion phase, cannot ensure firm adhesion between the hard dispersed phase and the continuously bonded phase. Accordingly, the above-mentioned blending ratios of (Ti, Al) N and WC were experimentally determined so as to ensure firm adhesion. It is preferable that both the blending ratios be set from 3 to 8%.

(c) c-BN

The c-BN phase forming the hard dispersed phase is extremely hard, and wear resistance can be improved using the same; however, if the blending ratio thereof is less than 35%, desired and superior wear resistance cannot be ensured, and on the other hand, if the blending ratio thereof is greater than 65%, sintering performance of the c-BN based material is degraded, and the cutting edge tends to easily chip; therefore, the blending ratio was set from 35 to 65%. It is more preferable that the blending ratio be set from 45 to 60%.

A titanium nitride (hereinafter referred to as TiN) layer exhibiting a gold color acting as a use-of-insert indication layer may be formed on the surface of the c-BN based cutting insert according to the present invention using a vapor deposition process. With regard to the film thickness of the vapor-deposited layer, an average film thickness of 0.5 to 5 μm is preferable because if the average film thickness of less than 0.5 μm, a gold color which is sufficient for indication is not provided, and 5 μm of average film thickness is sufficient for indication.

Moreover, the inventors have conducted further research to develop c-BN based sintered cutting inserts having excellent chipping resistance, and found that when a powder of inter-metallic compound having Ti and Al (hereinafter referred to as a Ti—Al compound), a powder of nitride compound having Ti and Al (hereinafter referred to as (Ti, Al) N)), and a powder of tungsten carbide (hereinafter referred to as WC) are used as ingredient powders in addition to powders of c-BN, TiN, and/or TiCN as ingredient powders, and mixed so that 3 to 8 wt % (hereinafter "%" indicates wt %) Ti—Al compound, 5 to 10% (Ti, Al) N, and 5 to 15% WC are contained, a c-BN based sintered cutting insert formed using the c-BN based material having the above ingredients exhibits excellent long-term cutting performance without having chipping at the cutting edge thereof due to insufficient adhesion of the c-BN phase even when it is used for performing finish cutting of a difficult-to-machine material, such as high-hardened steel, at high speed, because the powders of the Ti—Al compound, (Ti, Al) N, and WC, among all of the components, preferentially react so as to form a nitride compound having Ti, Al, and W (hereinafter referred to as (Ti, Al, W) CN) and aggregate on the surface of the powder of c-BN, in the c-BN based material having been sintered, the (Ti, Al, W) CN) intervenes between a continuously bonded phase made of TiN and/or TiCN and a hard dispersed phase of c-BN phase, and moreover, the (Ti, Al, W) CN) is firmly connected with both TiN and TiCN forming the continuously bonded phase and c-BN forming the hard dispersed phase so as to act as an intermediate adhesion phase.

The present invention was conceived based on the above research results, and the present invention provides a c-BN based sintered cutting insert having excellent chipping resistance formed by compacting and sintering cubic boron nitride based material exhibiting, in a structural observation using an electron microscope, a substantial three-phase structure including a continuously bonded phase, a hard dispersed phase, and an intermediate adhesion phase intervening between the continuously bonded phase and the hard dispersed phase, the c-BN based material consisting of: 20 to 37 wt % TiN and/or TiCN, for forming the continuously bonded phase; 3 to 8% Ti—Al compound, 5 to 10% (Ti, Al) N, and 5 to 15% WC, for forming the intermediate adhesion phase; and (35 to 55 wt %) c-BN, as the balance, for forming the hard dispersed phase.

Next, in the c-BN based sintered cutting insert according to the present invention, the reason the composition of the c-BN based material for forming the same was limited as described above will be explained below.

(d) TiN and/or TiCN

These components improve sintering performance and also increase strength by forming a continuously bonded phase; however, if the blending ratio thereof is less than 20%, desired strength cannot be ensured, and on the other hand, if the blending ratio thereof is greater than 37%, wear resistance is significantly decreased; therefore, the blending ratio was set from 20 to 37%.

A portion (5 to 10 wt %) of TiN and/or TiCN, which forms the continuously bonded phase, may be substituted by tantalum carbide (TaC) or niobium carbide (NbC). In this case, excellent chipping resistance can also be obtained, without causing any problems, as in the case in which these components are not contained.

(e) Ti—Al compound, (Ti, Al) N and WC

As described above, these components preferentially react so as to form (Ti, Al, W) CN during the sintering process, and aggregate on the surface of the powder of c-BN as the hard dispersed phase; therefore, in the c-BN based material having been sintered, the (Ti, Al, W) CN intervenes between TiN and TiCN as the continuously bonded phase and c-BN as the hard dispersed phase. Moreover, because the (Ti, Al, W) CN tends to be firmly connected with all of TiN, TiCN, and c-BN, adhesion of c-BN to TiN and TiCN is significantly improved, so that chipping resistance of the cutting edge is improved. However, when the blending ratio of at least one of these components deviates from the above-defined range, the component, as the intermediate adhesion phase, cannot ensure firm adhesion between the hard dispersed phase and the continuously bonded phase. Accordingly, the above-mentioned blending ratios of Ti—Al compound, (Ti, Al) N, and WC were experimentally determined so as to ensure firm adhesion.

(c) c-BN

The c-BN phase forming the hard dispersed phase is extremely hard, and wear resistance can be improved using the same; however, if the blending ratio thereof is less than 35%, desired and superior wear resistance cannot be ensured, and on the other hand, if the blending ratio thereof is greater than 55%, sintering performance of the c-BN based material is degraded, and the cutting edge tends to easily chip; therefore, the blending ratio was set from 35 to 55%.

A titanium nitride (hereinafter referred to as TiN) layer exhibiting a gold color acting as a use-of-insert indication layer may be formed on the surface of the c-BN based cutting insert according to the present invention using a vapor deposition process. With regard to the film thickness of the vapor-deposited layer, an average film thickness of 0.5 to 5 μm is preferable because if the average film thickness of less than 0.5 μm, a gold color which is sufficient for indication is not provided, and 5 μm of average film thickness is sufficient for indication.

DESCRIPTION OF THE PREFERRED EMBODIMENTS

First, a c-BN based sintered cutting insert will be specifically explained based on a first embodiment.

Ingredient powders, i.e., powders of TiN, TiCN, and TiC, for forming a continuously bonded phase, powder of WC, and powder of (Ti, Al)N (i.e., powder of $(Ti_{0.65}Al_{0.35})N$, powder of $(Ti_{0.50}Al_{0.50})N$, and powder of $(Ti_{0.35}Al_{0.65})N$, for forming an intermediate adhesion phase, and powder of c-BN as a hard dispersed phase, all of which have a predetermined average grain size in a range from 0.5 to 2 µm, were prepared and mixed in accordance with blending ratios shown in TABLES 1 and 2. (Note that numbers in composition formulas indicate atomic ratio.) The ingredient powders were mixed under wet conditions using a ball mill for 72 hours, were dried, and were compacted under pressure of 100 MPa so as to form a green compact having a diameter of 50 mm and a thickness of 1.5 mm. The green compact was held in a vacuum (pressure of 1 Pa) at a predetermined temperature in a range from 900 to 1300° C. for 1 hour so as to be pre-sintered. The pre-sintered compact was superposed on a cemented carbide plate which was separately prepared and had a diameter of 50 mm and a thickness of 2 mm (composition: WC–8% Co), and then the pre-sintered compact with the cemented carbide plate was inserted into an ultra-high pressure sintering apparatus held under a pressure of 5 GPa at a predetermined temperature in a range from 1200 to 1400° C. for 30 minutes so as to be sintered. After sintering, upper and lower faces of the sintered compact with the cemented carbide plate were ground using a diamond grindstone, and the sintered compact with the cemented carbide plate was cut into desired dimensions using an arc discharge wire-cut method so as to obtain c-BN based sintered cutting inserts of the present invention backed with the cemented carbide plate 1 to 12 (hereinafter referred to as cutting inserts of the present invention), and comparative c-BN based sintered cutting inserts 1 to 12 (hereinafter referred to as comparative cutting inserts).

In the comparative cutting inserts 1 to 12, the blending ratio of one of the powder of (Ti, Al) N and the powder of WC, for forming the intermediate adhesion phase, was set out of the range determined according to the present invention.

With regard to the cutting insert 11 of the present invention and the comparative cutting insert 11, the cutting inserts were subjected to ultrasonic cleaning in an acetone solvent, were dried, and set in an ordinary arc ion plating apparatus. In the arc ion plating apparatus, titanium metal was set as a cathode electrode (vapor source), air was discharged so that the inside of the apparatus was maintained at a vacuum at a pressure of 0.5 Pa or less, and the inside of the apparatus was heated to a temperature of 500° C. using a heater. Then, a bias DC voltage of −1000 V was applied to the cutting insert, and an electric current of 100 A was made flow as an arc discharge between the cathode electrode, i.e., titanium metal, and an anode electrode, so that the surface of the cutting insert was subjected to Ti bombardment cleaning. Next, a nitrogen gas, as a reaction gas, was introduced into the apparatus so as to prepare a reaction atmosphere at a pressure of 5 Pa, a bias DC voltage of −100 V was applied to the cutting insert, and an electric current of 100 A was made to flow as an arc discharge between the cathode electrode and the anode electrode, so that a gold colored TiN layer having an average thickness of 1.5 µm was vapor-deposited on the surface of the cutting insert 11 of the present invention and the surface of the comparative cutting insert 11.

The structure of the c-BN based material of each of the various cutting inserts that were obtained through the above processes was observed using a scanning electron microscope. As a result, all cutting inserts exhibited a three-phase structure substantially including a continuously bonded phase, a hard dispersed phase, and an intermediate adhesion phase intervening between the continuously bonded phase and the hard dispersed phase.

Each of the cutting inserts was brazed to a stepped portion formed in a tip of a cutting edge of a cemented carbide body (composition: WC–10% Co) so as to form a throwaway type cutting tool having a shape defined in the JIS (Japanese Industrial Standard)-TNMA160408. Each cutting insert was subjected to a high-speed, dry, continuous surface finish cutting test in which a workpiece of difficult-to-machine material was machined, and, in each case, flank wear of the cutting edge was measured.

The detailed test conditions were set as follows:

with regard to cutting inserts 1 to 4 of the present invention and the comparative cutting inserts 1 to 4, workpiece: a circular bar of carburized steel (JIS-SCM415, hardness: HRC62), cutting speed: 350 m/min, depth of cutting: 0.15 mm, feed: 0.1 mm/rev, time: 30 min, with regard to cutting inserts 5 to 8 of the present invention and the comparative cutting inserts 5 to 8, workpiece: a circular bar of carburized steel (JIS-SCM415, hardness: HRC62) with four evenly distributed longitudinal grooves, cutting speed: 300 m/min, depth of cutting: 0.15 mm, feed: 0.2 mm/rev, time: 60 min, and with regard to cutting inserts 9 to 12 of the present invention and the comparative cutting inserts 9 to 12, workpiece: nodular cast iron (JIS-FCD70), cutting speed: 450 m/min, depth of cutting: 0.15 mm, feed: 0.2 mm/rev, time: 30 min.

The test results are shown in TABLES 1 and 2.

With regard to the cutting inserts in each of which a gold colored TiN layer as a use-of-insert indication layer was vapor-deposited on the surface thereof, the surface of each insert was observed after the cutting test. As a result, the TiN layer on the cutting face and the flank of the cutting edge to which cut chips abutted and the TiN layer on the intersecting ridge between the cutting face and the flank were worn, so that the gray color of the base cutting insert is exposed, and thus whether the insert was used or not was easily determined based on the contrast between the gold color of a portion other than the portion in which the TiN layer was worn and the gray color of the base cutting insert.

| | | | | | Blending Ratio (wt %) | | | | Flank Wear |
|---|---|---|---|---|---|---|---|---|---|
| Identification | | TiN | TiCN | TiC | $(Ti_{0.65}Al_{0.35})N$ | $(Ti_{0.50}Al_{0.50})N$ | $(Ti_{0.35}Al_{0.65})N$ | WC | c-BN | (mm) |
| Cutting | 1 | 16 | 30 | — | 2 | — | — | 2 | Balance (50) | 0.24 |
| Insert | 2 | 20 | — | 17 | 2 | 4 | — | 3 | Balance (54) | 0.24 |
| of the | 3 | — | 43 | — | — | 2 | 2 | 5 | Balance (48) | 0.22 |
| Present | 4 | — | 30 | 15 | — | 8 | — | 7 | Balance (40) | 0.20 |
| Invention | 5 | 6 | 18 | 5 | — | — | 7 | 8 | Balance (56) | 0.25 |
| | 6 | 18 | 8 | — | 3 | — | 5 | 8 | Balance (58) | 0.24 |
| | 7 | — | 22 | 6 | 1 | 1 | 2 | 8 | Balance (60) | 0.20 |
| | 8 | 10 | — | 8 | 2 | 3 | 2 | 10 | Balance (65) | 0.20 |
| | 9 | 16 | 16 | — | 3 | — | 4 | 6 | Balance (55) | 0.23 |
| | 10 | 14 | — | 13 | — | 2 | 3 | 6 | Balance (62) | 0.20 |
| | 11 | 10 | 17 | 10 | — | — | 7 | 4 | Balance (52) | 0.18 |
| | 12 | 22 | — | 22 | 2 | 2 | 2 | 7 | Balance (43) | 0.18 |

| | | | | | Blending Ratio (wt %) | | | | | |
|---|---|---|---|---|---|---|---|---|---|---|
| Identification | | TiN | TiCN | TiC | $(Ti_{0.65}Al_{0.35})N$ | $(Ti_{0.50}Al_{0.50})N$ | $(Ti_{0.35}Al_{0.65})N$ | WC | c-BN | Cutting Test Result |
| Comparative Cutting Insert | 1 | 16 | 31 | — | 1* | — | — | 2 | Balance (50) | Tool Life Ended in 2 minutes |
| | 2 | 21.5 | — | 18 | 2 | 4 | — | 0.5* | Balance (54) | Tool Life Ended in 8 minutes |
| | 3 | — | 36 | — | — | 7* | 4* | 5 | Balance (48) | Tool Life Ended in 9 minutes |
| | 4 | — | 30 | 10 | — | 8 | — | 12* | Balance (40) | Tool Life Ended in 8 minutes |
| | 5 | 9 | 18 | 8.5 | — | — | 0.5* | 8 | Balance (56) | Tool Life Ended in 2 minutes |
| | 6 | 18 | 14.5 | — | 3 | — | 5 | 1.5* | Balance (58) | Tool Life Ended in 1 minute |
| | 7 | — | 18 | 2 | 4* | 2* | 6* | 8 | Balance (60) | Tool Life Ended in 1 minute |
| | 8 | 10 | — | 7 | 2 | 3 | 2 | 11* | Balance (65) | Tool Life Ended in 4 minutes |
| | 9 | 19 | 19 | — | 0.5* | — | 0.5* | 6 | Balance (55) | Tool Life Ended in 8 minutes |
| | 10 | 11 | — | 10 | — | 6* | 5* | 6 | Balance (62) | Tool Life Ended in 12 minutes |
| | 11 | 10 | 20 | 10 | — | — | 7 | 1* | Balance (52) | Tool Life Ended in 10 minutes |
| | 12 | 20 | — | 19 | 2 | 2 | 2 | 12* | Balance (43) | Tool Life Ended in 15 minutes |

(In the TABLE, *indicates conditions out of the range of the present invention, and tool life was ended due to chipping)

Based on the results shown in TABLES 1 and 2, the cutting inserts 1 to 12 of the present invention did not have chipping in the cutting edge thereof, i.e., exhibited excellent wear resistance and excellent long-term cutting performance, even when being used for high-speed turning operations or high-speed surface finishing operations for workpieces of difficult-to-machine material such as carburized steel. In contrast to this, when the blending ratio of at least one of the powder of Ti—Al compound and the powder of WC, for forming the intermediate adhesion phase, was set out of the range determined according to the present invention, as in the cases of the comparative cutting inserts 1 to 12, the cutting edge had chipping therein, and thereby tool life was exhausted in a relatively short period.

As explained above, the c-BN based cutting insert of the present invention exhibits excellent chipping resistance, of course, in cutting operations under normal conditions, and even in high-seed cutting operations or high-speed surface finishing operations for workpieces of difficult-to-machine material such as high-hardened steel because the c-BN phase is firmly bonded to the TiCN phase for substantially forming the continuously bonded phase due to the inter mediate adhesion phase intervening therebetween; therefore, the c-BN based cutting insert of the present invention sufficiently meets the requirements that cutting apparatuses should have high performance and high power, and that cutting operations should be performed with less power and less energy.

Next, a c-BN based sintered cutting insert will be specifically explained based on a second embodiment.

Ingredient powders, i.e., powders of TiN and TiCN, for forming a continuously bonded phase, powder of Ti—Al compound, powder of $Ti_2AlN$, and powder of WC, for forming an intermediate adhesion phase, and powder of c-BN as a hard dispersed phase, all of which have a predetermined average grain size in a range from 0.5 to 4 μm, were prepared and mixed in accordance with blending ratios shown in TABLE 3. The ingredient powders were mixed under wet conditions using a ball mill for 72 hours, were dried, and were compacted under pressure of 100 MPa so as to form a green compact having a diameter of 50 mm and a thickness of 1.5 mm. The green compact was held in a vacuum at a predetermined temperature in a range from 900 to 1300° C. for 1 hour so as to be pre-sintered. The pre-sintered compact was superposed on a cemented carbide plate which was separately prepared and had a diameter of 50 mm and a thickness of 2 mm (composition: WC–8% Co), and then the pre-sintered compact with the cemented carbide plate was inserted into an ultra-high pressure sintering apparatus and held under pressure of 5 GPa at predetermined temperature in a range from 1200 to 1400° C. for 30 minutes so as to be sintered. After sintering, upper and lower faces of the sintered compact with the cemented carbide plate were ground using a diamond grindstone, and the sintered compact with the cemented carbide plate was cut into desired dimensions using an arc discharge wire-cut method so as to obtain c-BN based sintered cutting inserts of the present invention backed with the cemented carbide plate 1 to 8 (hereinafter referred to as cutting inserts of the present invention), and comparative c-BN based sintered cutting inserts 1 to 6 (hereinafter referred to as comparative cutting inserts).

In the comparative cutting inserts 1 to 6, the blending ratio of one of the powder of Ti—Al compound, the powder of $Ti_2AlN$, and the powder of WC, for forming the intermediate adhesion phase, was set out of the range determined according to the present invention.

With regard to the cutting insert 8 of the present invention and the comparative cutting insert 6, the cutting inserts were subjected to ultrasonic cleaning in an acetone solvent, were dried, and were set in an ordinary arc ion plating apparatus. In the arc ion plating apparatus, titanium metal was set as a cathode electrode (vapor source), air was evacuated so that the inside of the apparatus was maintained at a vacuum at a pressure of 0.5 Pa or less, and the inside of the apparatus was heated to a temperature of 500° C. using a heater. Then, a bias DC voltage of −1000 V was applied to the cutting insert, and an electrical current of 100 A was made flow as an arc discharge between the cathode electrode, i.e., titanium metal, and an anode electrode, so that the surface of the cutting insert was subjected to Ti bombardment cleaning. Next, a nitrogen gas, as a reaction gas, was introduced into the apparatus so as to prepare a reaction atmosphere at a pressure of 5 Pa, a bias DC voltage of −100 V was applied to the cutting insert, and an electric current of 100 A was made flow as an arc discharge between the cathode electrode and the anode electrode, so that a gold colored TiN layer having an average thickness of 1.5 μm was vapor-deposited on each of the surface of the cutting insert 8 of the present invention and the surface of the comparative cutting insert 6.

The structure of the c-BN based material of each of the various cutting inserts that were obtained through the above processes was observed using a scanning electron microscope. As a result, all cutting inserts exhibited a three-phase structure substantially including a continuously bonded phase, a hard dispersed phase, and an intermediate adhesion phase intervening between the continuously bonded phase and the hard dispersed phase.

Each of the cutting inserts was brazed to a stepped portion formed in a tip of a cutting edge of a cemented carbide body (composition: WC–10% Co) so as to form a throwaway type cutting tool having a shape defined in the JIS-TNMA160408. Each cutting insert was subjected to a high-speed, dry, continuous surface finish cutting test in which a workpiece of difficult-to-machine material was machined, and, in each case, flank wear of the cutting edge was measured.

The detailed test conditions were set as follows:
workpiece: a circular bar of carburized steel (JIS-SCM415, hardness: HRC62) with four evenly distributed longitudinal grooves,
cutting speed: 300 m/min,
depth of cutting: 0.12 mm,
feed: 0.15 mm/rev,
time: 45 min.
The test results are shown in TABLE 3.

With regard to the cutting inserts in each of which a gold colored TiN layer as a use-of-insert indication layer was vapor-deposited on the surface thereof, the surface of each insert was observed after the cutting test. As a result, the TiN layer on the cutting face and the flank of the cutting edge to which cut chips abutted and the TiN layer on the intersecting ridge between the cutting face and the flank were worn, so that the gray color of the base cutting insert is exposed, and thus whether the insert was used or not was easily determined based on the contrast between the gold color of a portion other than the portion in which the TiN layer was worn and the gray color of the base cutting insert.

| Identification | | Blending Ratio (wt %) | | | | | Flank Wear (mm) | Composition of Sintered Body (wt %) | | | |
| --- | --- | --- | --- | --- | --- | --- | --- | --- | --- | --- | --- |
| | | Ti-Al Compound | $Ti_2AlN$ | WC | TiN | TiCN | c-BN | | TiN | TiCN | (Ti, Al, W) CN | c-BN |
| Cutting | 1 | 3 | 7 | 8 | — | 37 | Balance (45) | 0.24 | 5 | 35 | 15 | Balance (45) |
| Insert | 2 | 6 | 7 | 8 | 17 | 8 | Balance (54) | 0.2 | 22 | 7 | 17 | Balance (54) |
| of the | 3 | 8 | 7 | 8 | 25 | — | Balance (52) | 0.22 | 27 | — | 21 | Balance (52) |
| Present | 4 | 6 | 5 | 8 | 21 | 5 | Balance (55) | 0.19 | 28 | 5 | 15 | Balance (52) |
| Invention | 5 | 6 | 10 | 8 | — | 30 | Balance (46) | 0.23 | 4 | 29 | 21 | Balance (46) |
| | 6 | 6 | 7 | 5 | 37 | — | Balance (45) | 0.22 | 41 | — | 14 | Balance (45) |
| | 7 | 6 | 7 | 12 | 10 | 15 | Balance (50) | 0.18 | 12 | 15 | 23 | Balance (50) |
| | 8 | 6 | 7 | 15 | 12 | 8 | Balance (52) | 0.19 | 15 | 8 | 25 | Balance (52) |
| Comparative Cutting Insert | 1 | 1.5* | 7 | 8 | — | 37 | Balance (46.5) | Tool Life Ended in 18 minutes | 2.5 | 37 | 14 | Balance (46.5) |
| | 2 | 9.5* | 7 | 8 | 25 | — | Balance (50.5) | Tool Life Ended in 15 minutes | 28.5 | — | 21 | Balance (50.5) |
| | 3 | 6 | 3.5* | 8 | 21 | 5 | Balance (56.5) | Tool Life Ended in 17 minutes | 23.5 | 5 | 15 | Balance (56.5) |
| | 4 | 6 | 11* | 8 | — | 30 | Balance (45) | Tool Life Ended in 12 minutes | 2 | 30 | 23 | Balance (45) |
| | 5 | 6 | 7 | 3* | 37 | — | Balance (47) | Tool Life Ended in 17 minutes | 40 | — | 13 | Balance (47) |
| | 6 | 6 | 7 | 17* | 12 | 8 | Balance (50) | Tool Life Ended in 9 minutes | 14 | 8 | 28 | Balance (50) |

-continued

| | | Blending Ratio (wt %) | | | | | | | | |
|---|---|---|---|---|---|---|---|---|---|---|
| | | Ti-Al Compound | Ti₂AlN | WC | TiN | TiCN | c-BN | TaC | NbC | Flank Wear (mm) |
| Other | 9 | 8 | 7 | 8 | 12 | 5 | Balance (50) | 10 | — | 0.21 |
| Examples | 10 | 8 | 7 | 8 | 12 | 5 | Balance (50) | — | 10 | 0.19 |

(In the TABLE, *indicates conditions out of the range of the present invention, and tool life was ended due to chipping)

Based on the results shown in TABLE 3, the cutting inserts 1 to 8 of the present invention did not have chipping in the cutting edge thereof, i.e., exhibited excellent wear resistance and excellent long-term cutting performance, even when being used for high-speed turning operations or high-speed surface finishing operations for workpieces of difficult-to-machine material such as carburized steel. In contrast to this, when the blending ratio of at least one of the powder of Ti—Al compound, the powder of Ti₂AlN, and the powder of WC, for forming the intermediate adhesion phase, was set out of the range determined according to the present invention, as in the cases of the comparative cutting inserts 1 to 6, the cutting edge had chipping therein, and thereby tool life was exhausted in a relatively short period.

TABLE 3 further shows flank wear of the cutting edge as a result of high-speed, dry, continuous surface finish cutting tests in which workpieces of difficult-to-machine material were machined using cutting insert 9 in which a portion of TiN and TiCN for forming the continuously bonded phase was substituted by TaC (tantalum carbide), and cutting insert 10 in which, similarly, a portion of TiN and TiCN was substituted by NbC, as further Examples. These cutting inserts 9 and 10 did not have chipping in the cutting edge thereof, i.e., exhibited excellent wear resistance, as in the cases of cutting inserts 1 to 8, even when being used for high-speed surface finishing operations for workpieces of difficult-to-machine material such as carburized steel.

As explained above, the c-BN based cutting insert of the present invention exhibits excellent chipping resistance, of course, in cutting operations under normal conditions, and even in high-speed cutting operations or high-speed surface finishing operations for workpieces of difficult-to-machine material such as high-hardened steel because the c-BN phase is firmly bonded to the TiN phase and the TiCN phase, for substantially forming the continuously bonded phase, due to the intermediate adhesion phase intervening therebetween; therefore, the c-BN based cutting insert of the present invention sufficiently meets the requirements that cutting apparatuses should have high performance and high power, and that cutting operations should be performed with less power and less energy.

The invention claimed is:

1. A cutting insert comprising a cubic boron nitride based ultra-high pressure sintered material exhibiting, in a structural observation using an electron microscope, a substantially three-phase structure including a continuously bonded phase, a hard dispersed phase, and an intermediate adhesion phase intervening between the continuously bonded phase and the hard dispersed phase,
   wherein the cubic boron nitride based ultra-high pressure sintered material consists of:
   15 to 56 wt % of at least two components selected from titanium nitride, titanium carbonitride, and titanium carbide, or 15 to 56 wt % of titanium carbonitride, for forming the continuously bonded phase;
   2 to 10 wt % of a nitride compound having titanium and aluminum and 2 to 10 wt % of tungsten carbide, for forming the intermediate adhesion phase; and
   35 to 65 wt % of the cubic boron nitride, as the balance, for forming the hard dispersed phase.

2. A cutting insert comprising a cubic boron nitride based ultra-high pressure sintered material exhibiting, in a structural observation using an electron microscope, a substantially three-phase structure including a continuously bonded phase, a hard dispersed phase, and an intermediate adhesion phase intervening between the continuously bonded phase and the hard dispersed phase,
   wherein the cubic boron nitride based ultra-high pressure sintered material consists of:
   20 to 37 wt % of titanium nitride and/or titanium carbonitride, for forming the continuously bonded phase;
   3 to 8 wt % of an inter-metallic compound having titanium and aluminum, 5 to 10 wt % of a nitride compound having titanium and aluminum, and 5 to 15 wt % of tungsten carbide, for forming the intermediate adhesion phase; and
   35 to 55 wt % of the cubic boron nitride, as the balance, for forming the hard dispersed phase.

3. A cutting insert comprising a cubic boron nitride based ultra-high pressure sintered material exhibiting, in a structural observation using an electron microscope, a substantially three-phase structure including a continuously bonded phase, a hard dispersed phase, and an intermediate adhesion phase intervening between the continuously bonded phase and the hard dispersed phase,
   wherein the cubic boron nitride based ultra-high pressure sintered material consists of:
   10 to 32 wt % of titanium nitride and/or titanium carbonitride, and 5 to 10 wt % of tantalum carbide, for forming the continuously bonded phase;
   3 to 8 wt % of an inter-metallic compound having titanium and aluminum, 5 to 10 wt % of a nitride compound having titanium and aluminum, and 5 to 15 wt % of tungsten carbide, for forming the intermediate adhesion phase; and
   35 to 55 wt % of the cubic boron nitride, as the balance, for forming the hard dispersed phase.

4. A cutting insert comprising a cubic boron nitride based ultra-high pressure sintered material exhibiting, in a structural observation using an electron microscope, a substantially three-phase structure including a continuously bonded phase, a hard dispersed phase, and an intermediate adhesion phase intervening between the continuously bonded phase and the hard dispersed phase, wherein the cubic boron nitride based ultra-high pressure sintered material consists of:

10 to 32 wt % of titanium nitride and/or titanium carbonitride, and 5 to 10 wt % of niobium carbide, for forming the continuously bonded phase;

3 to 8 wt % of an inter-metallic compound having titanium and aluminum, 5 to 10 wt % of a nitride compound having titanium and aluminum, and 5 to 15 wt % of tungsten carbide, for forming the intermediate adhesion phase; and 35 to 55 wt % of cubic boron nitride, as the balance, for forming the hard dispersed phase.

5. The cutting insert according to any one of claims 1 to 4, comprising, on the surface thereof, a titanium nitride layer having an average film thickness of 0.5 to 5 μm as a use-of-insert indication layer.

6. The cutting insert according to claim 5, wherein an average film thickness of the titanium nitride layer is 5 μm.

* * * * *